United States Patent [19]
Blauer et al.

[11] Patent Number: 5,466,515
[45] Date of Patent: Nov. 14, 1995

[54] WEATHER PROTECTIVE FABRIC COMBINATION, OUTERWEAR CONSTRUCTED THEREFROM

[75] Inventors: Stephen Blauer; Charles Blauer, both of Lexington, Mass.

[73] Assignee: Blauer Manufacturing Company, Inc., Boston, Mass.

[21] Appl. No.: 222,524

[22] Filed: Apr. 4, 1994

[51] Int. Cl.⁶ .................................................. B32B 7/00
[52] U.S. Cl. ........................ 428/252; 428/246; 428/253; 428/304.4; 428/421; 428/422; 428/423.1
[58] Field of Search ................................ 428/246, 252, 428/253, 421, 422, 304.4, 423.1

[56] References Cited

U.S. PATENT DOCUMENTS

| | | | |
|---|---|---|---|
| 3,438,829 | 4/1969 | Coe | 156/235 |
| 3,651,520 | 3/1972 | Jacob | 2/272 |
| 3,703,730 | 11/1972 | Miller | 2/272 |
| 3,794,548 | 2/1974 | Wirth et al. | 161/89 |
| 3,804,700 | 4/1974 | Hoey et al. | 161/160 |
| 3,965,519 | 6/1976 | Hermann et al. | 15/104.93 |
| 4,148,958 | 4/1979 | Tischer et al. | 428/196 |
| 4,159,360 | 6/1979 | Kim | 428/195 |

OTHER PUBLICATIONS

Specification Sheet. Tech. Inform. TM Trademark of W. L. Gore & Associates, p. 1.
Catalog Gore–Tey in Performance of Service Mark of W. L. Gore & Associates, Inc. (9 pages).
"The Facts About Sympatex®" Akzo, Fibers and Polymer Division., *Enka America Inc.* (9 pages).

*Primary Examiner*—James J. Bell
*Attorney, Agent, or Firm*—Morse, Altman, Dacey & Benson

[57] ABSTRACT

A fabric structure comprising a shell and a lining free of each other. The shell includes an outer closely woven synthetic fabric, an inner connected high tensile strength pattern imprinted on the inner face thereof, and fluorocarbon impregnation thereof. The lining includes an intermediate outer synthetic polymer membrane, and an inner synthetic polymer fabric.

31 Claims, 1 Drawing Sheet

WEATHER PROTECTIVE FABRIC COMBINATION, OUTERWEAR CONSTRUCTED THEREFROM

FIELD OF THE INVENTION

The present invention relates to fabric constructions for outerwear, and, more particularly, to fabric constructions for coats, pants, jackets, boots, gloves and other outer clothing that are designed for protection against inclement weather.

The Prior Art

Clothing for inclement weather typically is constructed from fabrics or combinations of fabrics that strive to achieve seemingly inconsistent objectives. It is desired that such clothing be vapor permeable, water repellent, wind obstructing, stain resistant, dimensionally stable, externally durable, and internally comfortable. Vapor permeable membranes and/or tight weaving have been among the compromises needed to permit simultaneous vapor permeability, water repulsion and wind obstruction. Special fabrics and/or coatings have been among the compromises needed for stain resistance, dimensional stability, external durability and internal comfort. In particular, for example, the interstices within tightly woven fabric, which must remain open to achieve breathing, tend to become blocked by water proofing and wind blocking treatments. There is an ongoing need for the improvement of outerwear for protection against inclement weather.

BRIEF DESCRIPTION OF THE INVENTION

The present invention relates to outerwear comprising an outer shell and an inner lining that combine to achieve vapor permeability, water repellancy, wind obstruction, stain resistance, dimensional stability, external durability and internal comfort. More specifically, the present invention relates to a fabric construction comprising an outer shell and an inner lining that are characterized by particular materials and interrelationships.

The shell is composed of a tightly woven synthetic fabric, which initially has imprinted on its inner face a connected high tensile strength pattern, and which thereafter is impregnated with a protective coating. The lining is composed of a waterproof breathable membrane and a soft synthetic fabric support. The membrane has a structure that is characterized by either mechanical micropore diameters or hydrophilic molecular intervals which are infinitesimally smaller in dimension than the interstices in the synthetic fabric of the shell. External durability and stain resistance are provided by the tightly woven synthetic fabric of the shell. Dimensional stability is provided by the imprinted high tensile strength pattern. Water repellancy and wind obstruction are provided to some degree by the tightly woven synthetic fabric of the shell and to a major degree by the membrane of the lining. Vapor transmission is enabled by the breathable membrane of the lining and permitted by the interstices in the support for the breathable membrane, the interstices in the synthetic fabric of the shell and the openings in the pattern imprinted thereon. Comfortable contact with the wearer is provided by the fabric support for the breathable membrane.

The invention accordingly comprises the fabric structures, outerwear and processes which are described in the following specification, the scope of which will be indicated in the appended claims.

BRIEF DESCRIPTION OF THE DRAWINGS

For a fuller understanding of the nature and objects of the present invention, reference is made to the accompanying drawings, wherein.

DETAILED DESCRIPTION OF THE PREFERRED EMBODIMENT

Figure 1:
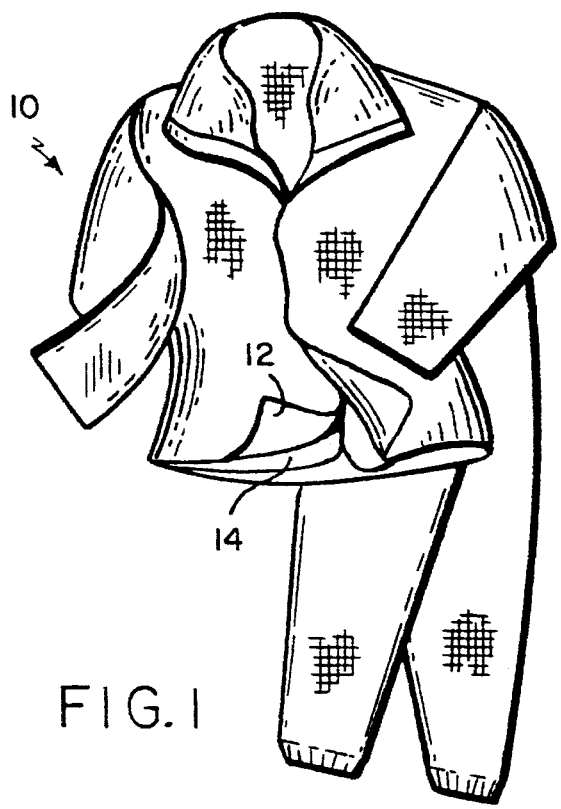
FIG. 1 is a perspective view of a storm coat and storm pants embodying the present invention.
Figure 2:
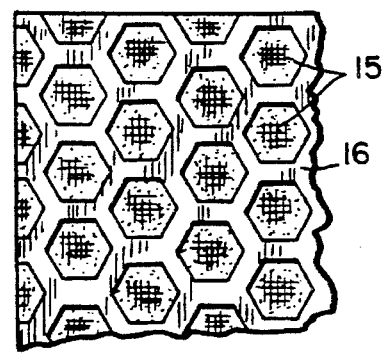
FIG. 2 illustrates the pattern which is imprinted on the inner face of the shell.
Figure 3:
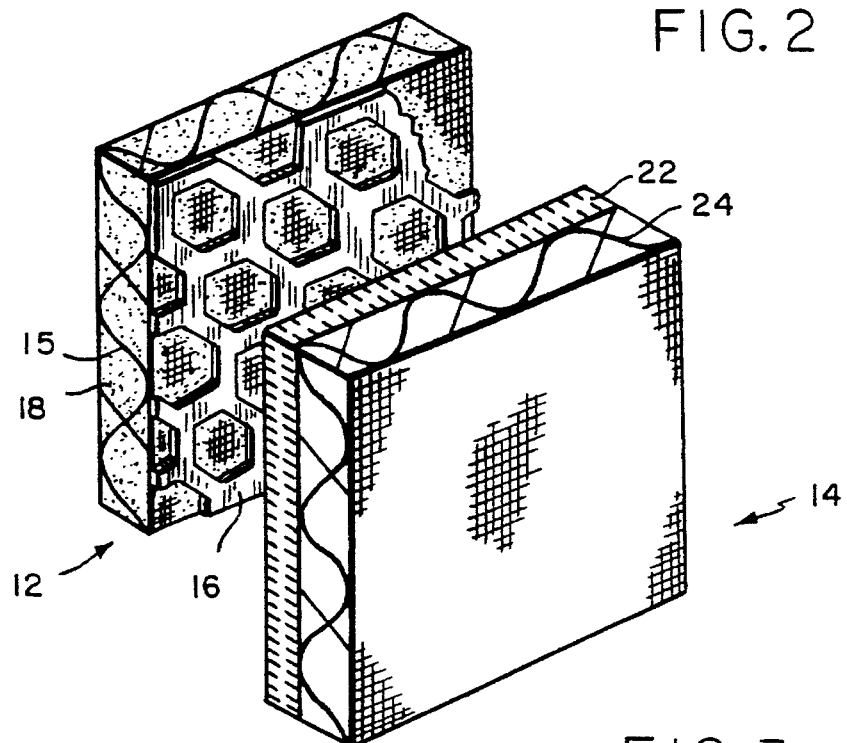
FIG. 3 is a grossly exaggerated view of the main fabric construction of the clothing of FIG. 1, cross-sectioned to illustrate fabric, impregnation and molecular or micro structure.

FIG. 1 illustrates an outdoor outfit 10 consisting of a jacket and pants that embody the present invention. All of the major areas, i.e. bodice, arms and legs, comprise an outer shell 12 and an inner lining 14. FIGS. 2 and 3 illustrate details of shell 12 and lining 14, of which the illustrated clothing is constructed.

Generally, shell 12 comprises a closely woven, synthetic polymer fabric stratum 15 that is characterized generally by a low level of water absorption, i.e. nylon, acrylic or polyester. After being scoured and dyed, the inner face of fabric stratum 15 is directly imprinted with a connected but open pattern stratum 16 of a relatively high tensile strength, highly flexible elastomer, for example, an acrylic urethane. Preferably, the pattern is characterized by solid portions that cover between 30 and 70% of substrate fabric 15, has from 5 to 15 openings per inch and weigh from 0.1 to 1 oz. per square yard. Following imprinting of pattern stratum 16, the entire fabric, together with pattern stratum 16, is impregnated with a finishing composition 18, particularly a fluorocarbon release agent that will not clog the interstices of the fabric.

Generally, lining 14 comprises, at its outer face, a membrane stratum 22 and, at its inner face, a fabric stratum 24. Membrane stratum 22 is composed of a thin polymer which, by virtue of its physico-chemical structure, i.e. its microstructure or molecular structure, is capable of repelling liquid water, but of transmitting water vapor. Fabric stratum 24 is shown as a knitted or woven synthetic that presents a soft, comfortable surface for contact with and drape about a wearer. In a further embodiment of the present invention, the membrane stratum is sandwiched between a pair of such fabric strata.

In one form, membrane stratum is an expanded microporous polymer, i.e. a polymer which has been stretched to produce therethrough microscopic pores (micropores) that are sufficiently large to permit the transmission of water vapor, but that are too small to permit the passage of droplets of liquid water. Droplets of liquid water have a sufficiently large surface tension to preclude deformation necessary for passage through the micropores.

In another form, membrane stratum is a hydrophilic polymer having molecular chains along which water vapor travels through the thermal gradient established between a relatively high temperature at the surface of a wearer and a relatively low temperature remote from the surface of the wearer.

The following are preferred examples of different components of the fabric construction of the present invention.

EXAMPLE I

Shell Fabric 15
Cloth Type:
200 Denier nylon (warp), and 3 ply 70 denier taslanized nylon (filling), plain weave.
Count:
warp: 114, filling: 52
Weight (uncoated):
5.5 oz. per sq. yd. (+or −0.4 oz.)
Break Strength [lbs]:
warp: 351 [min.], filling: 156 [min.]
Tear Strength [lbs]:
warp: 19 [min.], filling: 8 [min.]
Shrinkage:
warp 2% [max.], filling 2% [max.]
Color Fastness and Crocking:
Good

EXAMPLE II

Shell Fabric 15
Cloth Type:
nylon 70 denier (warp), and 2 ply taslanized nylon 70 denier (filling), plain weave.
Count:
warp: 158, filling: 68
Weight: (uncoated):
3.0 oz. per sq. yd. (+or −0.4 oz.)
Break Strength [lbs]:
warp: 210 [min.], filling: 100 [min.]
Tear Strength [lbs]:
warp: 4 [min.], filling: 6 [min.]
Shrinkage:
warp 2% [max.], filling 2% [max.]
Color Fastness and Crocking:
Good 20/40 hours

EXAMPLE III

Printed Pattern 16

Honeycomb pattern printed, non-ravel coating to ensure breathability, prevent seam slippage, and to maintain shell fabric appearance. The coating consists of an aqueous blend of acrylic, urethane and silicone. The resulting pattern consists of a terpolymer which on drying contains about 12 to 30% urethane, about 1% silicone, and a roughly remainder of acrylic. During printing, the viscosity is adjusted so that it may be applied with a rotary screen printing head onto dyed fabric using a rotary screen having the desired pattern. In the present case, the screen is designed to have a hexagonal pattern with about 50% coverage and 9 cells per linear inch. Preferred coating weight add-on is in the range of 0.3 to 0.5 ounces per square yard. A formulation of this type is sold by Lyons Coatings, Inc., Franklin, Mass., under the trade designation Coating Compound 975-3.

EXAMPLE IV

Protective Impregnation 18

After pattern 16 has been applied and dried, shell 12 is given a water repellent treatment which consists of a protective material being applied onto the surface and dried in a manner which is well understood by those skilled in the art. One such coating is a fluorocarbon solution sold by 3M under the trade designation SCOTCHGARD. It has been found that durability of pattern 16 and its adhesion to fabric 15 is optimum when protective impregnation 18 occurs after pattern 16 has been applied.

EXAMPLE V

Vapor Permeable Membrane 22

Membrane 22 is a porous composite made from two components. One component is pure expanded polytetrafluoroethylene. This portion of the membrane contains about nine billion pores per square inch. The pores are much smaller than a droplet of liquid water but much larger than a molecule of water vapor. Liquid water cannot pass through the membrane but moisture vapor can pass through. The other component is polyalkylene oxide polyurethane-urea, an oleophobic substance that prevents contamination of the membrane from oils, cosmetics, insect repellents, food substances, and other hazards. Porous membranes 22 are manufactured and sold by W. L. Gore & Associates, Inc., Elkton, Md. under the trade designation GORE-TEX.

This membrane has the following specifications: Waterproof-Breathable Membrane:

Weight (oz/yd$^2$):
0.75 oz/yd$^2$ (+or −0.25)
Breathability (MVTR g/m$^2$/24 hrs):
650 minimum
ASTM E-96-80 Procedure B
Hydrostatic Resistance (psi):
60 minimum
Federal Standard 191, Method
5512 (Mullen Tester)

EXAMPLE VI

Vapor Permeable Membrane 22

Membrane is a non-porous, hydrophilic polyester ether, the molecular chains of which have a water vapor conductive or capillary effect. Water vapor enters into the closed membrane and moves along the molecular chains. The direction of movement is determined by the water vapor concentration gradient between the front and back of the membrane. In the vicinity of a textile, water vapor is mixed with air. As the temperature of air rises, it can absorb increasing concentrations of water vapor: For example, the warm air between skin and clothing can absorb up to approx. 40 μg/m$^3$ of water vapor, and outside air at 20° C. up to 17 g/m$^3$. Even in rainy weather, the water vapor is higher on the side closest to the skin, than on the outside. This results in transport of water vapor from inside to outside. Non-porous hydrophilic polyesters of this type are sold under the trade designation SYMPATEX by Enka. This membrane has the following specifications.

| | |
|---|---|
| Raw material: | hydrophilic polyester ether |
| Structure: | homogeneous, non-porous |
| Density: | 1.27 g/m$^3$ |
| Thickness: | 15 μm |
| Width: | 155 cm |
| Visual properties: | colorless, transparent, slightly opaque |
| Softening point: | above 200° C. |
| Melting point: | above 220° C. |
| Shrinkage in hot air: | slight shrinkage (<1%) up to 200° C. |

| | |
|---|---|
| Strength: | more than 1,5 daN/5 cm |
| Stretch before tearing: | approx. 300% |
| Permanent stretch: | approx. 20% after 50% overall stretch |
| Recovery: | up to approx. 4% overall stretching no residual stretching |
| Moisture absorption: | 1.6% at 50% relative humidity, 20° C. |
| Windproofness: | no air passage (DIN 53887) |
| Water absorption: | approx. 5% at 20° C. after wetting and spin drying |
| Water vapor permeability: | above 2500 g/m2 24 hr ASTM E 96-66 (method B, modified) |
| Water Tightness: | no water permeation at 1 bar = 10 m water column (DIN 53886) |

EXAMPLE VII

Fabric Laminate 24

In one form, the waterproof-breathable membrane is laminated to a nylon tricot weave or weave knit, resulting in a dry-cleanable waterproof material with high moisture vapor transmission. This fabric has the following specifications:

Cloth Type:

40 denier single ply 100% nylon tricot weave or knit

Count:

Wales: 39

Courses: 40

Color:

White

EXAMPLE VIII

Fabric Laminates 24

In another form, there are two fabric lamina 24, in the form of woven synthetic polymer, preferably polyester. These lamina sandwich the membrane therebetween and have the following specifications:

Cloth Type:

100% texturized polyester, 70 denier warp and filling, jet dyed, plain weave

Count:

warp: 102, filling: 97

Weight:

2.18 oz. per square yard

Color:

charcoal grey

EXAMPLE IX

Preferred Combination

Preferred combination of shell and lining comprises the following:

Shell fabric 15 nylon as specified in Example I

Pattern 16 copolymer as specified in Example III

Protective impregnation 18 fluorocarbon as specified in Example IV

Membrane 22 polytetrafluoroethylene, polyalkylene oxide polyurethane urea composite as specified in Example V Single fabric laminate 24 nylon tricot weave or knit as specified in EXAMPLE VII.

EXAMPLE X

Preferred Combination

Another preferred combination of shell and lining comprises the following:

Shell fabric 15 nylon as specified in Example I

Pattern 16 copolymer as specified in Example III

Protective impregnation 18 fluorocarbon as specified in Example IV

Membrane 22 hydrophilic polyester ether as specified in EXAMPLE VI

Single fabric laminate 24 nylon tricot weave or knit as specified in EXAMPLE VII.

OPERATION

Shell 12 and lining 14 cooperate in the following manner. Vapor permeability is enabled by the micropores of membrane 22, in cooperation with the openings in printed pattern 16 and the interstices of fabric strata 15, 24. Water repellancy is achieved by treated fabric 15, 18, and by membrane 22 which protects against seepage through fabric 15. Wind obstruction is achieved by fabric 15 and membrane 22. Stain resistance and durability are achieved by fabric 15 and the treatment 18 to which it has been subjected. Fabric 24 has a pleasant hand and feel. The construction ensures a comfortable balance among evaporation, conduction and convection in the space between the shell and the lining.

What is claimed is:

1. A fabric structure comprising a shell and a lining secured in close proximity to each other:

(a) said shell including an outer woven synthetic fabric, an intermediate inner connected pattern imprinted on the inner face thereof, and release agent impregnation thereof;

(b) said lining including an intermediate outer synthetic polymer water-vapor permeable membrane, and an inner synthetic polymer fabric;

(c) said pattern being adapted to maintain the shape of said shell.

2. The fabric structure of claim 1 wherein said outer closely woven synthetic fabric is selected from the class consisting of nylon, acrylic and polyester.

3. The fabric structure of claim 1 wherein said outer closely woven synthetic fabric is polyhexamethylene adipamide.

4. The fabric structure of claim 1 wherein said pattern is composed of an acrylic urethane copolymer.

5. The fabric structure of claim 1 wherein said pattern is characterized by from 30 to 70% coverage of the area of said outer fabric.

6. The fabric structure of claim 1 wherein said pattern is an acrylic-urethane-silicone terpolymer.

7. The fabric structure of claim 1 wherein said fabric of said shell is impregnated with a fluorocarbon release agent.

8. The fabric structure of claim 1 wherein said membrane includes an expanded polytetrafluoroethylene having micropores.

9. The fabric structure of claim 1 wherein said membrane includes an expanded composite of polytetrafluoroethylene and polyalkylene oxide polyurethaneurea.

10. The fabric structure of claim 1 wherein said membrane is a polyester ether.

11. The fabric structure of claim 1 wherein said inner synthetic polymer fabric is hydrophobic.

12. The fabric structure of claim 1 wherein said inner synthetic polymer fabric is selected from the class consisting of nylon and polyester.

13. The fabric structure of claim 1 wherein said inner synthetic polymer fabric is selected from the class consisting of nylon knits, nylon weaves, and polyester.

14. An article of clothing comprising a shell and a lining that are secured in close proximity to each other:
   (a) said shell including an outer closely woven synthetic fabric, an inner connected high tensile strength pattern imprinted on the inner face thereof, and release agent impregnation thereof;
   (b) said lining including an intermediate outer synthetic polymer membrane and an inner synthetic polymer fabric, said membrane being selected from the class consisting of (1) expanded polytetrafluoroethylene (2) and hydrophilic polyester ether;
   (c) said pattern being adapted to maintain the shape of said shell.

15. The article of clothing of claim 14 wherein said outer closely woven synthetic fabric is selected from the class consisting of nylon, acrylic and polyester.

16. The article of clothing of claim 14 wherein said outer closely woven synthetic fabric is polyhexamethylene adipamide.

17. The article of clothing of claim 14 wherein said pattern is composed of an acrylic urethane copolymer.

18. The article of clothing of claim 14 wherein said pattern is characterized by from 30 to 70% coverage of the area of said outer fabric.

19. The article of clothing of claim 14 wherein said pattern is an acrylic-urethane-silicone terpolymer.

20. The article of clothing of claim 14 wherein said fabric of said shell is impregnated with a fluorocarbon release agent.

21. The article of clothing of claim 14 wherein said membrane includes an expanded polytetrafluoroethylene.

22. The article of clothing of claim 14 wherein said inner synthetic polymer fabric is hydrophobic.

23. The article of clothing of claim 14 wherein said inner synthetic polymer fabric is selected from the class consisting of nylon and polyester.

24. The article of clothing of claim 1 wherein said inner synthetic polymer fabric is selected from the class consisting of nylon knits, nylon weaves, and polyester.

25. An article of clothing comprising a shell and a lining secured in close proximity to each other:
   (a) said shell including an outer closely woven synthetic fabric, an inner connected relatively high tensile strength pattern imprinted on the inner face thereof, and fluorocarbon impregnation thereof;
   (b) said lining including an intermediate outer synthetic polymer membrane and an inner synthetic polymer fabric;
   (c) said outer closely woven synthetic fabric being selected from the class consisting of nylon, acrylic and polyester;
   (d) said pattern being characterized by a two-dimensional series of contiguous hollow hexagonal shapes with common sides, the width of each said hexagonal shape being such that there are approximately 9 of said hexagonal shapes to the inch, and the hollow of each said hexagonal shape being of such a size as to have approximately 50% coverage of the area of said outer fabric, said pattern being interrupted at intervals with an information logo;
   (e) said pattern being composed of an acrylic-urethane-silicone terpolymer;
   (f) said fluorocarbon being a release agent;
   (g) said membrane including an expanded composite of polytetrafluoroethylene and polyalkylene oxide polyurethane-urea;
   (h) said inner synthetic polymer fabric being hydrophobic;
   (i) said inner synthetic polymer fabric being a nylon.

26. An article of clothing comprising a shell and a lining secured in close proximity to each other:
   (a) said shell including an outer closely woven synthetic fabric, an inner connected relatively high tensile strength pattern imprinted on the inner face thereof, and fluorocarbon impregnation thereof;
   (b) said lining including an intermediate outer synthetic polymer membrane and an inner synthetic polymer fabric;
   (c) said outer closely woven synthetic fabric being selected from the class consisting of nylon, acrylic and polyester;
   (d) said pattern being characterized by a two-dimensional series of contiguous hollow hexagonal shapes with common sides, the width of each said hexagonal shape being such that there are approximately 9 said hexagonal shapes to the inch, and the hollow of each said hexagonal shape being of such a size as to have approximately 50% coverage of the area of said outer fabric, said pattern being interrupted at intervals with an information logo;
   (e) said pattern being composed of an acrylic-urethane-silicone terpolymer;
   (f) said fluorocarbon being a release agent, and said fabric of said shell being impregnated with said release agent after said pattern is imprinted;
   (g) said membrane including non-porous hydrophilic polyester ether;
   (h) said inner synthetic polymer fabric being hydrophobic;
   (i) said inner synthetic polymer fabric being a nylon.

27. The article of clothing of claim 14 wherein said membrane is a polyester ether.

28. An article of clothing comprising a shell and a lining that are secured in close proximity to each other:
   (a) said shell including an outer closely woven synthetic fabric, an inner connected high tensile strength pattern imprinted on the inner face thereof, and release agent impregnation thereof;
   (b) said lining including an intermediate outer synthetic polymer membrane and an inner synthetic polymer fabric, said membrane including an expanded composite of polytetrafluoroethylene and polyalkylene oxide polyurethane-urea;
   (c) said pattern being adapted to maintain the shape of said shell.

29. A shell fabric structure comprising:
   (a) an outer closely woven synthetic fabric, an inner connected relatively high tensile strength pattern imprinted on the inner face thereof, and release agent impregnation thereof;

(b) said outer fabric having a plain weave, having good color fastness and crocking, and having a warp and a filling;

(c) said outer fabric warp being substantially of 200 Denier nylon, having a count of substantially 114, a break strength of not substantially less than 351 pounds, a tear strength of not substantially less than 19 pounds, and a shrinkage of not substantially more than 2%;

(d) said outer fabric filling being substantially 3 ply 70 denier taslanized nylon, having a count of substantially 52, a break strength of not substantially less than 156 pounds, a tear strength of not substantially less than 8 pounds, and a shrinkage of not substantially more than 2%;

(e) said outer fabric having an uncoated weight of substantially 5.5 ounces per square yard;

(f) said pattern being characterized by a two-dimensional series of contiguous hollow hexagonal shapes with common sides, the width of each said hexagonal shape being such that there are substantially 9 said hexagonal shapes to the inch, and the hollow of each said hexagonal shape being of such a size as to have substantially 50% coverage of the area of said outer fabric;

(g) said pattern being interrupted at intervals with an information logo;

(h) said pattern being composed of an acrylic-urethane-silicone terpolymer which, upon drying, contains substantially from 12 to 30% urethane, substantially 1% silicone, and the remainder acrylic;

(i) said pattern having a coating add-on weight of substantially from 0.3 to 0.5 ounces per square yard;

(j) said release agent being a fluorocarbon;

(k) said fabric of said shell being impregnated with said release agent after said pattern is imprinted.

30. A fabric structure comprising a shell and a lining secured in close proximity to each other:

(a) said shell including an outer closely woven synthetic fabric, an inner connected relatively high tensile strength pattern imprinted on the inner face thereof, and release agent impregnation thereof;

(b) said lining including and intermediate outer synthetic polymer membrane and an inner synthetic polymer fabric;

(c) said outer closely woven synthetic fabric having a plain weave, having good color fastness and crocking, and having a warp and a filling;

(d) said outer fabric warp being substantially 200 Denier nylon, having a count of substantially 114, a break strength of not substantially less than 351 pounds, a tear strength of not substantially less than 19 pounds, and a shrinkage of not substantially more than 2%;

(e) said outer fabric filling being substantially 3 ply 70 denier taslanized nylon, having a count of substantially 52, a break strength of not substantially less than 156 pounds, a tear strength of not substantially less than 8 pounds, and a shrinkage of not substantially more than 2%;

(f) said outer fabric having an uncoated weight of substantially 5.5 ounces per square yard;

(g) said pattern being characterized by a two-dimensional series of contiguous hollow hexagonal shapes with common sides, the width of each said hexagonal shape being such that there are substantially 9 said hexagonal shapes to the inch, and the hollow of each said hexagonal shape being of such a size as to have substantially 50% coverage of the area of said outer fabric;

(h) said pattern being interrupted at intervals with an information logo;

(i) said pattern being composed of an acrylic-urethane-silicone terpolymer which, upon drying, contains substantially from 12 to 30% urethane, substantially 1% silicone, and the remainder acrylic;

(j) said pattern having a coating add-on weight of substantially from 0.3 to 0.5 ounces per square yard;

(k) said release agent being a fluorocarbon;

(l) said outer closely woven synthetic fabric being impregnated with said release agent after said pattern is imprinted;

(m) said membrane including an expanded composite of polytetrafluoroethylene and polyalkylene oxide polyurethane-urea;

(n) said membrane having a weight of substantially 0.75 ounces per square yard, a breathability of not substantially less than 650 grams per square meter per 24 hours based on ASTM E-96-80 Procedure B, and a hydrostatic resistance of not substantially less than 60 pounds per square inch based on Federal Standard 191 Method 5512;

(o) said inner synthetic polymer fabric being substantially of 40 denier single ply 100% nylon tricot weave, having a wales of substantially 39 and a courses of substantially 40.

31. A fabric structure comprising a shell and a lining secured in close proximity to each other:

(a) said shell including an outer closely woven synthetic fabric, an inner connected relatively high tensile strength pattern imprinted on the inner face thereof, and release agent impregnation thereof;

(b) said lining including and intermediate outer synthetic polymer membrane and an inner synthetic polymer fabric;

(c) said outer closely woven synthetic fabric having a plain weave, having good color fastness and crocking, and having a warp and a filling;

(d) said outer fabric warp being substantially 200 Denier nylon, having a count of substantially 114, a break strength of not substantially less than 351 pounds, a tear strength of not substantially less than 19 pounds, and a shrinkage of not substantially more than 2%;

(e) said outer fabric filling being substantially 3 ply 70 denier taslanized nylon, having a count of substantially 52, a break strength of not substantially less than 156 pounds, a tear strength of not substantially less than 8 pounds, and a shrinkage of not substantially more than 2%;

(f) said outer fabric having an uncoated weight of substantially 5.5 ounces per square yard;

(g) said pattern being characterized by a two-dimensional series of contiguous hollow hexagonal shapes with common sides, the width of each said hexagonal shape being such that there are substantially 9 said hexagonal shapes to the inch, and the hollow of each said hexagonal shape being of such a size as to have substantially 50% coverage of the area of said outer fabric;

(h) said pattern being interrupted at intervals with an information logo;

(i) said pattern being composed of an acrylic-urethane-silicone terpolymer which, upon drying, contains substantially from 12 to 30% urethane, substantially 1% silicone, and the remainder acrylic; (j) said pattern having a coating add-on weight of substantially from 0.3 to 0.5 ounces per square yard; (k) said release agent being a fluorocarbon;

(l) said outer closely woven synthetic fabric being impregnated with said release agent after said pattern is imprinted;

(m) said membrane including a non-porous, hydrophilic polyester ether;

(n) said membrane having a density of substantially 1.27 grams per cubic meter, a thickness of substantially 15 micrometers, a water vapor permeability of not substantially less than 2500 grams per square meter per 24 hours based on ASTM E-96-66 method B modified, and no water permeation at substantially 1 bar of pressure;

(o) said inner synthetic polymer fabric being substantially of 40 denier single ply 100% nylon tricot weave, having a Wales of substantially 39 and a courses of substantially 40.

* * * * *